United States Patent [19]

VanCleve

[11] 4,357,430
[45] Nov. 2, 1982

[54] POLYMER/POLYOLS, METHODS FOR MAKING SAME AND POLYURETHANES BASED THEREON

[75] Inventor: Russell VanCleve, Charleston, W. Va.

[73] Assignee: Union Carbide Corporation, Danbury, Conn.

[21] Appl. No.: 308,052

[22] Filed: Oct. 2, 1981

[51] Int. Cl.³ .............................................. C08G 18/14
[52] U.S. Cl. .................................... 521/128; 521/137; 524/710; 524/728; 524/732; 524/761; 525/123; 525/139
[58] Field of Search ............... 524/710, 728, 732, 761; 525/123, 139; 521/128, 137

[56] References Cited

U.S. PATENT DOCUMENTS

| | | | |
|---|---|---|---|
| Re. 28,715 | 7/1976 | Stamberger | 260/33.2 |
| Re. 29,014 | 10/1976 | Pizzini et al. | 260/33.2 |
| Re. 29,118 | 1/1977 | Stamberger | 521/137 |
| 2,552,528 | 5/1951 | DeGroote | 252/331 |
| 2,562,878 | 8/1951 | Blair, Jr. | 252/340 |
| 2,605,232 | 7/1952 | DeGroote | 252/340 |
| 2,679,521 | 5/1954 | DeGroote | 260/475 |
| 2,692,873 | 10/1954 | Langerak et al. | 260/77.5 |
| 2,771,471 | 11/1956 | DeGroote | 260/347.4 |
| 2,834,780 | 5/1958 | Wheeler et al. | 260/268 |
| 2,917,480 | 12/1959 | Bailey et al. | 260/42 |
| 2,946,767 | 7/1960 | Basel | 260/47 |
| 2,948,691 | 8/1960 | Windemuth et al. | 260/2.5 |
| 2,996,551 | 8/1961 | DeGroote et al. | 260/615 |
| 3,028,433 | 4/1962 | Leis et al. | 260/615 |
| 3,054,778 | 9/1962 | Henen et al. | 260/77.5 |
| 3,073,788 | 1/1963 | Hostettler et al. | 260/2.5 |
| 3,089,863 | 5/1963 | Hicks et al. | 260/75 |
| 3,192,186 | 6/1965 | Mueller et al. | 260/77.5 |
| 3,194,773 | 7/1965 | Hostettler | 260/2.5 |
| 3,252,943 | 5/1966 | Dankert et al. | 260/77.5 |
| 3,304,273 | 2/1967 | Stamberger | 260/2.5 |
| 3,383,351 | 5/1968 | Stamberger | 260/33.2 |
| 3,392,153 | 7/1968 | Hostettler et al. | 260/77.5 |
| 3,459,733 | 8/1969 | Byrd, Jr. et al. | 260/210 |
| 3,467,605 | 9/1969 | Abercrombie et al. | 260/2.5 |
| 3,505,377 | 4/1970 | Morehouse | 260/448.2 |
| 3,585,185 | 6/1971 | Levis, Jr. | 260/210 |
| 3,625,921 | 12/1971 | Wooster et al. | 260/77.5 |
| 3,639,541 | 2/1972 | Austin et al. | 260/952 |
| 3,639,542 | 2/1972 | Pizzini et al. | 260/952 |
| 3,652,639 | 3/1972 | Pizzini et al. | 260/75 NN |
| 3,655,553 | 4/1972 | DeWald | 260/859 R |
| 3,823,201 | 7/1974 | Pizzini et al. | 260/861 |
| 3,846,347 | 11/1974 | Satterly | 260/2.5 |
| 3,850,861 | 11/1974 | Fabris et al. | 260/2.5 BE |
| 3,875,086 | 4/1975 | Ramey et al. | 260/2.5 AM |
| 3,875,258 | 4/1975 | Patton, Jr. et al. | 260/869 |
| 3,931,450 | 1/1976 | Patton, Jr. et al. | 428/315 |
| 3,950,317 | 4/1976 | Patton, Jr. et al. | 260/88.3 A |
| 3,953,393 | 4/1976 | Ramlow et al. | 260/33.2 R |
| 3,963,681 | 6/1976 | Kaneko et al. | 216/77.5 |
| 3,963,818 | 6/1976 | Sakoda et al. | 264/56 |
| 4,014,846 | 3/1977 | Ramlow et al. | 260/33.2 R |
| 4,018,815 | 4/1977 | Vogt et al. | 260/485 G |
| 4,024,088 | 5/1977 | Godlewski | 260/2.5 A |
| 4,045,474 | 8/1977 | Taller et al. | 260/484 A |
| 4,061,614 | 12/1977 | Self | 260/40 R |
| 4,061,684 | 12/1977 | Helfert et al. | 260/615 B |
| 4,072,704 | 2/1978 | Langdon | 260/463 |
| 4,082,703 | 4/1978 | Duffy et al. | 260/2.5 BE |
| 4,093,573 | 6/1978 | Ramlow et al. | 260/2.5 BE |
| 4,104,236 | 8/1978 | Simroth | 260/33.2 R |
| 4,111,865 | 9/1978 | Seefried, Jr. et al. | 521/137 |
| 4,113,785 | 9/1978 | Helfert et al. | 260/615 B |
| 4,119,586 | 10/1978 | Shah | 521/137 |
| 4,130,603 | 12/1978 | Tanaka et al. | 260/860 |
| 4,144,395 | 3/1979 | Murphy et al. | 560/200 |
| 4,148,840 | 4/1979 | Shah | 260/859 R |
| 4,153,643 | 5/1979 | Preston et al. | 260/861 |
| 4,153,778 | 5/1979 | Park et al. | 528/76 |
| 4,172,825 | 10/1979 | Shook et al. | 260/33.2 R |
| 4,198,488 | 4/1980 | Drake et al. | 521/137 |
| 4,208,314 | 6/1980 | Priest et al. | 260/33.2 R |
| 4,242,249 | 12/1980 | VanCleve et al. | 260/33.2 R |

FOREIGN PATENT DOCUMENTS

| | | |
|---|---|---|
| 735010 | 5/1966 | Canada. |
| 785835 | 5/1968 | Canada. |
| 48-101494 | 12/1973 | Japan. |
| 1126025 | 9/1968 | United Kingdom. |
| 1217005 | 12/1970 | United Kingdom. |
| 1220471 | 1/1971 | United Kingdom. |
| 2021602 | 5/1979 | United Kingdom. |

OTHER PUBLICATIONS

"PHD Polyols-A New Class of PUR Raw Materials", K. G. Spitler, J. J. Lindsey, *Journal of Cellular Plastics*, 43-49, Jan./Feb., 1981.

Primary Examiner—Maurice J. Welsh
Attorney, Agent, or Firm—Eugene C. Trautlein; Paul W. Leuzzi, II

[57] ABSTRACT

This invention relates to normally liquid, stable polymer/polyol compositions formed by polymerizing, in the presence of a free radical catalyst, an ethylenically unsaturated monomer or monomers dissolved or dispersed in a polyol mixture including a coupled polyol consisting of the reaction product of a polyol having a functionality in excess of 2 reacted with polyisocyanate in such proportion that the ratio of hydroxyl groups to isocyanato groups is greater than 1. In one embodiment, the coupled polyol is made in situ in the base polyol by addition thereto of the required amount of the polyisocyanate. The novel polymer/polyol compositions are convertible to polyurethane foams and elastomers.

41 Claims, No Drawings

POLYMER/POLYOLS, METHODS FOR MAKING SAME AND POLYURETHANES BASED THEREON

BACKGROUND OF THE INVENTION

This invention relates to polymer/polyol compositions and to polyurethanes utilizing such compositions.

Polymer/polyol compositions suitable for use in producing polyurethane foams, elastomers and the like are known materials. Such compositions can be produced by polymerizing one or more ethylenically unsaturated monomers dissolved or dispersed in a polyol in the presence of a free radical catalyst. These polymer/polyol compositions have the valuable property of imparting to, for example, polyurethane foams and elastomers produced therefrom, higher load-bearing properties than are provided by the corresponding unmodified polyols.

There are a number of prior disclosures relating to production of polymer/polyol compositions. The basic patents in the field are Stamberger U.S. Pat. No. Re. 28,715 (reissue of U.S. Pat. No. 3,383,351) and U.S. Pat. No. Re. 29,118 (reissue of U.S. Pat. No. 3,304,273). Other prior disclosures include: British Pat. No. 1,126,025; Scharf et al. Canadian Pat. No. 735,010; Kuryla Canadian Pat. No. 785,835; Pizzini et al. U.S. Pat. No. 3,652,639; Pizzini et al. U.S. Pat. No. Re. 29,014 (reissue of U.S. Pat. No. 3,823,201); Patton, Jr., et al. U.S. Pat. No. 3,950,317; Ramlow et al. U.S. Pat. No. 3,953,393; DeWald U.S. Pat. No. 3,655,553; Fabris et al. U.S. Pat. No. 3,850,861; Priest et al. U.S. Pat. No. 4,208,314; Simroth U.S. Pat. No. 4,104,236; Shah U.S. Pat. No. 4,148,840; Shah U.S. Pat. No. 4,119,586; Shook et al. U.S. Pat. No. 4,172,825; Drake et al. U.S. Pat. No. 4,198,488; Preston et al. U.S. Pat. No. 4,153,643; Japanese Pat. No. 48-101494; and Japanese Pat. No. 52-80919/75.

The polymer/polyol compositions that found initial commercial acceptance were primarily compositions produced using acrylonitrile. Such compositions were somewhat higher in viscosity than desired in some applications. Further, such compositions were at least primarily used commercially in producing foams under conditions such that the heat generated during foaming is readily dissipated (e.g.—the foams have a relatively thin cross-section) or under conditions such that relatively little heat is generated during foaming. When polyurethane foams were produced under conditions such that the heat generated during foaming was not readily dissipated, severe foam scorching usually resulted. Later, polymer/polyol compositions produced from acrylonitrile-methylmethacrylate monomer mixtures were commercialized and were convertible to polyurethane foams having reduced scorch.

More recently, polymer/polyol compositions produced from acrylonitrile-styrene monomer mixtures have been used commercially. Use of low ratios of acrylonitrile-to-styrene in the monomer mixture affords polymer/polyols that do not give rise to a scorch problem. But it is increasingly difficult to make satisfactorily stable polymer/polyols as the ratio of acrylonitrile to styrene is reduced to the desired levels.

The development of sophisticated, high speed and large volume equipment, machines and systems for handling, mixing and reacting polyurethane-forming ingredients has created the need for highly stable polymer/polyols. At one time, there was not much concern for the seediness, viscosity or filterability of polymer/polyols in actual commercial practice. However, the state of the art of polyurethane production has now advanced to the point where these considerations are very important in many applications. There is now much concern with filterability, seediness, and viscosity; and polymer/polyols must meet certain minimum requirements in order to be capable of being processed in the sophisticated foam equipment now used. Typically, the prime requirement is that the polymer/polyols possess sufficiently small particles so that filters, pumps and the like do not become plugged or fouled in relatively short periods of time.

While somewhat simplified, the commercial processability of a particular polymer/polyol comes down to its viscosity and stability against phase separation. Lower viscosities are of substantial practical and economic significance due to the ease of pumping and metering as well as ease of mixing during the formation of polyurethanes. Stability is a prime consideration in insuring that the polymer/polyols can be processed in commercial production equipment without the necessity of additional mixing to insure homogeneity.

In addition to the monomer ratio in acrylonitrile-styrene polymer/polyols, other recognized factors that affect product stability include polyol molecular weight and polymer content.

In producing polymer/polyols for use in certain polyurethane elastomer applications, relatively low molecular weight polyols are typically utilized to provide the requisite product stiffness. However, it has been found that it is increasingly difficult to make satisfactorily stable polymer/polyols as the molecular weight of the polyol is decreased.

Still other applications could desirably utilize polyurethane foams and elastomers with even higher load-bearings capacities than can be currently provided using available polymer/polyols. However, it has been found that it is increasingly difficult to make satisfactorily stable polymer/polyols as the amount of polymer is increased.

U.S. Pat. No. 4,208,314 to Priest et al. discloses low viscosity polymer/polyols made from acrylonitrile-styrene monomer mixtures. These polymer/polyols can be converted to low density, water blown polyurethane foams having reduced scorch, especially when the acrylonitrile to styrene ratio is relatively low. The Priest et al. patent also provides a process for making polymer/polyols whereby the particulate nature of the product is considerably improved, compared to polymer/polyols prepared by prior processes. Using prior procedures, such as the one disclosed in Canadian Pat. No. 735,010, polymer/polyols formed from such monomer mixtures usually contained excessive amounts of large granules. The improved process provided by Priest et al. includes, in general, maintaining a low monomer concentration throughout the reaction mixture during the polymerization.

U.S. Pat. No. 4,104,236 to Simroth discloses a substantial further improvement in forming polymer/polyols made from acrylonitrile-styrene monomer mixtures, which enables selection of the polymer content to provide a polymer/polyol having satisfactory stability when a polyol of given molecular weight and a monomer mixture having a ratio of accrylonitrile to styrene within a certain range are used. The Simroth patent also highlights the fact that satisfactory product stability is not obtained when many combinations of otherwise desirable composition parameters are used.

U.S. Pat. No. 4,172,825 to Shook et al. discloses further improvements in the formation of polymer/polyols. As discussed therein, polymer/polyol compositions exhibiting outstanding properties can be made by utilizing a specific type of peroxide catalyst, namely t-alkyl peroxyester catalysts. By utilizing this specific type of catalyst, polymer/polyols can be produced on a commercial basis which have outstanding properties, such as filterability in processing, yet which allow either the polymer or the styrene content to be increased. Also, polymer/polyols can be produced on a commercial scale with polyols having a molecular weight lower than had been used prior to this invention.

A further improvement in the formation of polymer/polyols is provided by U.S. Pat. No. 4,148,840 to Shah, which discloses a process for producing highly stable and filterable polymer/polyol compositions by polymerizing the monomer or monomers in situ in a polyol mixture that includes a minor amount of preformed polymer/polyol.

Yet another improvement is disclosed in U.S. Pat. No. 4,119,586 to Shah, which discloses a process for producing highly stable polymer/polyol compositions by polymerizing the monomer or monomers in situ in a polyol mixture that includes a major amount of a low molecular weight polyol and a minor amount of high molecular weight polyol.

U.S. Pat. No. 4,242,249 to VanCleve et al. discloses yet another approach to producing stable polymer/polyols in cases where the composition parameters are such at conventional processes would not usually afford a stable product. In the process disclosed by this patent, the monomer mixture is polymerized in a polyol that contains a minor amount of a preformed stabilizer that is tailored to the monomer mixture used. The stabilizer is a copolymer comprised of an anchor portion that is a polymer of the monomer mixture, and a solvatable portion consisting of a propylene oxide polymer having a number average molecular weight of at least about 800.

It has been recognized that the stability of polymer/polyols requires the presence of a minor amount of a graft or addition copolymer which is formed in situ from the polymer and polyol. Some prior approaches have thus been directed to incorporation of amounts of unsaturation to the polyol in addition to that inherently present in the polyoxyalkylene polyols typically used in forming polymer/polyols in the belief that improved stability will result due to an increased amount of an addition copolymer stabilizer expected to be formed. U.S. Pat. Nos. 3,652,639, 3,823,201, and 3,850,861, British Pat. No. 1,126,025, and Japanese Pat. Nos. 52-80919 and 48-101494 all utilize this approach.

U.S. Pat. No. 3,850,861 thus discloses the in situ polymerization of ethylenically unsaturated monomers in an unsaturated polyol. Suitable polyols are prepared by using an ethylenically unsaturated polyhydric initiator to form a polyalkylene oxide. The examples set forth include dibasic acids or their derivatives, such as maleic acid. The polyol polymerization medium contains one mole of unsaturation per mole of polyol.

U.S. Pat. No. 3,652,639 likewise discloses the in situ polymerization of ethylenically unsaturated monomers in an ethylenically unsaturated polyol medium. The unsaturated polyols of this patent are produced in a manner similar to those of U.S. Pat. No. 3,823,201, as will be discussed hereinafter, except that the level of unsaturation is higher, being on the order of 1 to 3 moles of unsaturation per mole of polyol.

U.S. Pat. No. 3,823,201 discloses a method of preparing a polymer/polyol by the in situ polymerization of ethylenically unsaturated monomers in a polyol having from 0.1 to 0.7 mole of unsaturation per mole of polyol. Unsaturation at the levels set forth in the U.S. Pat. No. 3,652,639 patent were indicated as imparting unnecessarily high viscosities to the resulting polymer/polyols. The unsaturation level that is added can be introduced into the polyol by, for example, reacting it with an ethylenically unsaturated compound that is capable of adding to the polyol by reaction with the hydroxyl group, such as maleic anhydride. The polymer/polyols disclosed in U.S. Pat. No. 3,823,201 are asserted to be highly stable due to the presence of the stabilizing species which is formed via the grafting of vinyl polymer chain segments to the unsaturated polyol molecules. Certain improvements in polyurethanes using such polymer/polyols are likewise asserted. More particularly, it is stated that such polymer/polyols are surprisingly superior to those prepared from polyols having high unsaturation in regard to their low viscosities. It is further stated that polyurethane foams prepared from these graft copolymers exhibit superior load-bearing properties.

British Pat. No. 1,126,025 discloses in situ polymerization of ethylenically unsaturated monomers in a polyol having a molecular weight from 250 to 10,000, preferably from 300 to 7,000, and containing at least 0.7 double bonds per molecule. It is stated that suitable unsaturated polyols can be made by including unsaturated compounds such as unsaturated polyhydric alcohols, polycarboxylic acids, or epoxides in the reaction mixture when the polyol is formed, but that it is preferred to introduce the unsaturation by reacting a preformed polyol with an unsaturated epoxide, e.g., allyl glycidyl ether.

Japanese Pat. No. 52-80919 discloses products that are said to be useful in preparation of polyurethanes which are produced by polymerizing unsaturated polyether-esters, or copolymerizing an unsaturated polyether-ester with a vinyl monomer. The unsaturated polyether-ester is prepared by reacting a polyol having a molecular weight of 1,000 to 30,000 with a mixture of saturated and unsaturated dicarboxylic acids. It is stated that the mole ratio of saturated dicarboxylic acid to unsaturated dicarboxylic acid should be from 95/5 to 50/50 to control polymerization. In the Examples, the products are described as being very homogeneous and stable.

Japanese Patent No. 48-101494 discloses in situ polymerization of ethylenically unsaturated monomers in modified polyether polyols obtained by reacting a polyether polyol first with an unsaturated dicarboxylic acid anhydride in an amount more than 0.2 mole per mole of polyol, and then with an epoxy compound, preferably an alkylene oxide, in an amount of preferably 1.1 to 1.5 moles per mole of unsaturated dicarboxylic acid anhydride.

A further approach to production of polymer/polyols is disclosed in U.S. Pat. No. 4,198,488 to Drake et al. In the process disclosed in this patent, the monomer mixture that is polymerized in the polyol includes a minor amount of an ethylenically unsaturated dicarboxylic acid anhydride. It was theorized that some graft copolymer is produced when a portion of the dicarboxylic acid anhydride units that have polymerized into the polymer undergo a reaction with the hydroxyl groups of the polyol. And it was further theorized that the graft copolymer formed in this way acts as a stabilizer for the polymer dispersion.

While many of the above techniques have provided improved and beneficial results, there are certain cases where none of these techniques have provided products which were entirely satisfactory. Thus, for example, in some situations, the use of the blended base polyol approach results in an undue lowering of the hydroxyl number of the blend with a resultant adverse effect upon foam performance. Other approaches, while generally satisactory, are too expensive for many commercial applications, too complicated, result in color and odor problems or require foam reformulations which can create undue difficulties.

It is highly desirable for low density slab stock foam applications to be able to provide virtually scorch-free products. This can be accomplished at foam densities of about 2.5 pounds per cubic foot or so. It may also be possible with existing technology to provide foams with scorch-free characteristics at even lower densities; but, typically, the technology used either requires an economic penalty or results in less than satisfactory foam characteristics. There thus remains the need to provide techniques capable of producing, without substantial economic penalty, virtually scorch-free slab stock foams at ever decreasing densities (viz.-1.75 pounds per cubic foot or less) while maintaining satisfactory load-bearing and other foam properties.

Further, some foam applications require quite rigorous combustibility resistance. It is quite difficult with existing polymer/polyol technology to provide foams from vinyl monomer systems which meet such requirements. There thus remains an unfilled need to provide technology which can utilize vinyl monomer systems, yet satisfy these rigorous combustibility standards.

There has also been considerable development directed towards making and utilizing various polyols modified by what has been sometimes described as coupling agents. Prior patents directed to such coupled polyols include: U.S. Pat. Nos. 2,946,767; 3,054,778; 3,963,818; 4,018,815; 4,045,474; 4,061,614; 4,061,684; 4,072,704 and 4,113,785.

Coupled polyols are utilized for many applications. For example, U.S. Pat. No. 4,072,704 provides products useful as surfactants made from individual blocks of polymers and copolymers of alkylene oxides by reacting these with bifunctional compounds. U.S. Pat. No. 4,061,684 suggests the preparation of highly branched polyether polyols of high molecular weight by coupling an alkoxylated polyglycerol by reacting the sodium alcoholate of the oxyalkylated polyglycerol with, for example, a dibenzene sulfo-ester of a diol containing 2 to 6 carbon atoms. The resulting products are viscous, resinous materials, suitable for use as hydrophilic, water-swellable gels, and the like. U.S. Pat. No. 4,113,785 concerns the preparation of polyoxyalkylene polyols by reacting polyether bis-alcoholates with selected bis-epoxides, to obtain products of higher molecular weight than can be prepared using a direct oxyalkylation reaction.

Still further, the utilization of various isocyanates as coupling agents for various polyol, or polyol-type materials, has been suggested. U.S. Pat. No. 2,946,767 thus suggests the reaction of a polyisocyanate, especially a diisocyanate, with an addition product having a molecular weight of at least 1000 of an alkylene oxide, especially ethylene oxide, with a compound which contains at least 8 carbon atoms and contains only one hydrogen atom capable of reacting with an alkylene oxide, e.g.—a monoalcohol such as dodecanol. The reaction products are surface-active and are stated to be valuable assistants for the production of dispersed systems, such as emulsions or suspensions.

U.S. Pat. No. 3,054,778 suggests the reaction of polyoxyethylene glycol, or a polyoxyalkylene glycol that is water-soluble and consists predominantly of oxyethylene groups, with an organic diisocyanate in proportions and under conditions such that a substantially linear, water-soluble, film-forming, orientable, polyglycolpolyurethane resin having high tensile strength and elongation is produced. The resins are useful as warp-sizing agents, flocculating agents in aqueous media and for the production of films and fibers.

U.S. Pat. No. 3,963,681 discloses elastomer compositions prepared by using polyfunctional isocyanate, curing agent and certain polyethers having a weight average molecular weight within the range of 1000 to less than 4,500. As the polyether, it is suggested that a pre-extended polyether may be used, which is prepared by subjecting a low molecular weight polyether to reaction with a diisocyanate or by subjecting a diol compound to reaction with a diisocyanate prepolymer of polyether.

Despite all of these prior efforts, no one has suggested the utilization per se of an isocyanate-coupled polyol to provide polymer/polyols or polyurethanes utilizing such polymer/polyols. Indeed, the only known prior use of such coupled polyols in polymer/polyols is described in U.S. Pat. No. 4,242,249 to VanCleve et al., previously described, wherein one technique for forming the preformed stabilizer consisting of an anchor portion and a solvatable portion employs a solvatable portion which is the reaction product of a propylene oxide material with toluene diisocyanate. The resulting solvatable portion is then reacted with the monomer or monomers forming the anchor portion to provide the preformed stabilizer. It is stated that it is preferred that the propylene oxide material be monofunctional, although difunctional materials are satisfactory. The use of tri- or higher functionality materials, it is noted, should be avoided as extensive cross-linking has been found to occur.

It is accordingly an object of the present invention to provide polymer/polyols characterized by satisfactory stability which could not be readily made by prior techniques.

A further object provides a process for making such polymer/polyols that is relatively straight forward and does not require significant economic penalties as compared with currently known techniques.

Yet another and more specific object of this invention is to provide a technique for preparation such polymer/polyols capable of conversion to polyurethanes without imparting thereto undesirable effects upon the physical properties.

A still further object of the present invention is to provide a virtually scorch-free, relatively low density, polyurethane slab-stock foam made from a vinyl polymer, polymer/polyol.

Other objects of this invention will be apparent from the description set forth hereinafter.

SUMMARY OF THE INVENTION

The present invention is based on the discovery that polymer/polyols with satisfactory stability and other characteristics can be provided by utilizing a polyisocyanate-coupled polyol. This invention thus provides a normally liquid, stable polymer/polyol composition formed by polymerizing, in the presence of a free radical catalyst, (1) from about 10 to about 50 weight percent of a mixture of acrylonitrile and styrene in a weight ratio, respectively, of from about 80:20 to about 20:80, dissolved or dispersed in (2) from about 50 to about 90 weight percent of a polyol mixture consisting of (a) a base polyol having a number average molecular weight of at least about 500 and (b) a coupled polyol consisting essentially of the reaction product of a polyol having a functionality in excess of 2 reacted with a polyisocyanate in such proportion that the ratio of hydroxyl groups to isocyanato groups is greater than 1, the coupled polyol being present in an amount sufficient to stabilize the resulting polymer/polyol.

In accordance with one aspect of this invention, the coupled polyols are prepared in situ in the base polyol by adding the requisite amount of the polyisocyanate to form the desired level of coupled polyol. By this technique, it is possible to avoid any handling problems attendant with coupled polyols having higher than desired viscosities. Moreover, and significantly, in situ preparation of the coupled polyols should provide a lower viscosity for the resulting polymer/polyol in comparison to utilization of a separately prepared coupled polyol, later blended with the base polyol.

DESCRIPTION OF PREFERRED EMBODIMENTS

The exact polyol, or blend or mixture, employed as the base polyol depends upon the end-use of the polyurethane product to be produced. For example, when foams are prepared, the molecular weight or the hydroxyl number is selected to result in flexible or semi-flexible foams. The polyols in this instance preferably possess a hydroxyl number of from about 50 to about 150 for semi-flexible foams and from about 25 to about 70 for flexible foams. As a further example, for elastomer applications, it will generally be desirable to utilize relatively high molecular weight base polyols having relatively low hydroxyl numbers, e.g., 25 to 50 or so. Such limits are not intended to be restrictive, but are merely illustrative of the large number of possible combinations for the polyol or polyols used.

The hydroxyl number is defined as the number of milligrams of potassium hydroxide required for the complete hydrolysis of the fully phthalated derivative prepared from 1 gram of polyol. The hydroxyl number can also be defined by the equation:

$$OH = (56.1 \times 1000 \times f)/m.w.$$

where
OH = hydroxyl number of the polyol
f = functionality, that is, average number of hydroxyl groups per molecule of polyol
m.w. = number average molecular weight of the polyol The most preferred base polyols employed in this invention include the poly(oxypropylene) polyols. Generally, the nominal functionality of such polyols will be in the range of about 3 to 4 or so. These polyols also include poly(oxypropyleneoxyethylene) polyols; however, desirably, the oxyethylene content should comprise less than 80 percent of the total and preferably less than 60 percent. The ethylene oxide, when used, can be incorporated in any fashion along the polymer chain. Stated another way, the ethylene oxide can be incorporated either in internal blocks, as terminal blocks, or may be randomly distributed along the polymer chain. As is well known in the art, the polyols that are most preferred herein contain varying small amounts of unsaturation. Unsaturation in itself does not affect in any adverse way the formation of the polymer/polyols in accordance with the present invention except in the case where the extent or type of unsaturation is so high as to result in a highly cross-linked polymer or gel.

While poly(oxypropylene) polyols are preferred, substantially any of the polyols previously used in the art to make polymer/polyols can be used as the base polyol in this invention. Illustrative of the polyols useful in producing polymer/polyol compositions in accordance with this invention are the polyhydroxyalkanes, the polyoxyalkylene polyols, or the like. Among the polyols which can be employed are those selected from one or more of the following classes of compositions, alone or in admixture, known to those skilled in the polyurethane art:

(a) Alkylene oxide adducts of polyhydroxyalkanes;
(b) Alkylene oxide adducts of non-reducing sugars and sugar derivatives;
(c) Alkylene oxide adducts of phosphorus and polyphosphorus acids;
(d) Alkylene oxide adducts thereof of polyphenols;
(e) The polyols from natural oils such as castor oil, and the like.

Illustrative alkylene oxide adducts of polyhydroxyalkanes include, among others, the alkylene oxide adducts of 1,3-dihydroxypropane, 1,3-dihydroxybutane, 1,4-dihydroxybutane, 1,4-, 1,5- and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, caprolactone, polycaprolactone, sylitol, arabitol, sorbitol, mannitol, and the like.

A further class of polyols which can be employed are the alkylene oxide adducts of the non-reducing sugars, wherein the alkylene oxides have from 2 to 4 carbon atoms. Among the non-reducing sugars and sugar derivatives contemplated are sucrose, alkyl glycosides such as methyl glucoside, ethyl glucoside, and the like, glycol glycosides such as ethylene glycol glucoside, propylene glycol glycoside, glycerol glucoside, 1,2,6-hexanetriol glucoside, and the like, as well as the alkylene oxide adducts of the alkyl glycosides as set forth in U.S. Pat. No. 3,073,788.

A still further useful class of polyols is the polyphenols, and preferably the alkylene oxide adducts thereof wherein the alkylene oxides have from 2 to 4 carbon atoms. Among the polyphenols which are contemplated are, for example, bisphenol A, bisphenol F, condensation products of phenol and formaldehyde, and novolac resins; condensation products of various phenolic compounds and acrolein; the simplest member of this class being 1,1,3-tris(hydroxyphenyl) propanes, condensation products of various phenolic compounds and glyoxal, glutaraldehyde, and other dialdehydes, the simplest members of this class being the 1,1,2,2-tetrakis (hydroxyphenol) ethanes, and the like.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

With regard to the coupled polyol constituent, it is preferred to use the poly(oxypropylene)polyols likewise preferred for the base polyol. However, any of the polyols described as useful for the base polyol may likewise be employed, depending upon the characteristics desired. While coupled polyols made from diols are satisfactory for preparing polymer/polyols which are stable, such low functionality materials are undesirable for use in preparing polyurethane foams and elastomers. These (and lower functionality) materials tend to adversely affect certain physical properties such as, for example, the static fatigue characteristics of such polyurethanes. In accordance with this invention, the coupled polyols are therefore made utilizing polyols having a functionality in excess of 2.0. Preferably, the polyol employed has an average functionality in the range of about 2.5 to 4 or so, to provide urethane products with satisfactory physical properties, more preferably, a nominal triol is utilized.

It should be appreciated that, as with the base polyol, a blend or mixture of more than one polyol could be utilized, if desired, to form the coupled polyol.

Any of the known polyisocyanates utilized for forming polyurethanes may be employed in forming the coupled polyol. Toluene diisocyanate has been employed and allows preparation of the coupled polyol by a facile synthesis and may be preferred due to its commercial availability and price. Other polyisocyanates which have been satisfactorily utilized are: hexamethylene diisocyanate, methylene bis(4-cyclohexyl isocyanate) and MDI, diphenyl methane 4,4'-diisocyanate. Polymeric isocyanates having a functionality in excess of 2 such as, for example, polymeric MDI, should likewise be satisfactory.

The coupled polyols may be made either in situ as previously described, or separately and then blended with the base polyol. When in situ preparation is utilized, the herein described advantages will be obtained. However, as is apparent, the polyol constituent will comprise those molecules of the base polyol coupled to the polyisocyanate employed. This will be quite satisfactory for many applications; however, there may be situations where it is desirable to utilize a polyol or polyols different from the base polyol for the coupled polyol. In those situations, the coupled polyol is prepared separately. For example, separate preparation of the coupled polyol allows synthesis of higher molecular weight products than can be achieved with the in situ technique. Such higher molecular weight coupled polyols tend to be more effective in conferring stability to polymer/polyols. A penalty of increased viscosity will, however, be involved. The preparation technique utilized may then accordingly represent a balance between the effectiveness desired and the viscosity which can be tolerated.

In either technique, the synthesis of the coupled polyol may be carried out, for example, by feeding the polyisocyanate to the polyol which is being agitated and held at slightly elevated temperatures in the range of about 60° to 90° C. under an inert atmosphere, such as nitrogen. Optionally, before or after completion of the feeding of the polyisocyanate, a catalyst such as dibutyltindilaurate can be added (e.g.—20 p.p.m.), and the temperature held at the temperature of the agitated polyol until the product viscosity stabilizes. A period of about 2 to 4 hours will generally be satisfactory. Other known catalysts for the reaction of an isocyanate with a polyol may be utilized, but it is preferred to use a catalyst that will not be adversely affected by materials such as a peroxide which might be present in the polyol utilized.

It will generally be desirable to utilize as great an excess of polyol in relation to the polyisocyanate as is possible, so as to minimize viscosity. In addition, to avoid the presence of free isocyanato groups, the polyol should be present in an amount sufficient to provide an excess of hydroxyl groups. Moreover, viscosity considerations are involved. Mole ratios of polyol to polyisocyanate of at least 2:1 are accordingly preferred. This will provide a ratio of hydroxyl to isocyanato groups (with the functionalities of the polyol and isocyanate used) of about 2:1 to 3:1 in most instances. However, when formed separately, mole ratios as low as 3:2 or 4:3 may be employed to form relatively higher molecular weight coupled polyols. The limiting mole ratio will generally be determined by the viscosity level which can be tolerated.

Conceptually, the monomers used in preparing the polymer/polyols of this invention can comprise any ethylenically unsaturated monomer or monomers. A variety of monomers are disclosed in the prior patents relating to polymer/polyols previously referred to. The selection of the monomer or monomers used will depend on considerations such as the relative cost of the monomers and the product characteristics required for the intended application.

The preferred monomer mixture used to make the polymer portion of the polymer/polyol compositions of this invention is a mixture of acrylonitrile and styrene. The relative weight proportions of acrylonitrile to styrene can range from about 80:20 to about 20:80. When it is desired to utilize higher polymer contents, useful ratios will tend towards higher acrylonitrile contents, e.g.—80:20 to 50:50, more preferably, 80:20 to 70:30 for maximized polymer contents. For reduced scorch applications, it will generally be desirable to utilize ratios of 50:50 to 20:80, more preferably 40:60 or lower. However, when utilizing the present invention, stable polymer/polyols with relatively high polymer contents (e.g.—in excess of 30 weight percent or so) can be prepared, even with acrylonitrile to styrene ratios as low as 40:60 or so. To prepare virtually scorch-free, slab-stock foams of densities of 1.75 pounds per cubic foot or lower, it is preferred to utilize a ratio of about 30:70 or lower.

It may be desirable in some applications to utilize, with acrylonitrile, a comonomer other than styrene. Representative examples of suitable comonomers include methyl methacrylate, vinyl chloride and vinylidene chloride.

The polymer content of the polymer/polyol can vary within wide limits, depending upon the requirements of the anticipated end use application. It will usually be desirable to form the polymer/polyols with as high a polymer content as will provide the desired viscosity and stability properties. In general, this will vary from about 10 to about 50 percent, based upon the weight of the polymer/polyol. Lower polymer contents may, of course, be utilized; however, there is typically no incentive to use monomer amounts which will result in polymer contents lower than about 10 percent by weight because of the lower conversions and the economic penalty due to the increased throughput involved. On the other hand, it will generally be undesirable to utilize polymer contents in excess of about 40 percent by weight or so. While useful polymer/polyols with higher polymer contents certainly can be made, such polymer/polyols may possess viscosity and stability characteristics which are commercially undesirable.

The polyol content of the polymer/polyol varies from about 50 to about 90 percent, based upon the weight of the polymer/polyol. The relative amount of the coupled polyol utilized will depend upon the parameters involved, viz.—the relative amount of polymer, the particular monomer or monomers used, the molecular weight of the base polyol and the polymer/polyol stability characteristics required. Functionally, the coupled polyol should be present in an amount sufficient to provide the desired polymer/polyol stability characteristics. In general, the amount required to accomplish such characteristics will increase with increasing polymer contents and decreasing acrylonitrile:styrene monomer ratios and base polyol molecular weight. It should be suitable to satisfy most situations by including the coupled polyol in an amount in the range of from about 5 to about 50 percent, based upon the total weight of the base polyol and a 2:1 mole ratio of polyol to polyisocyanate. If a polyol to polyisocyanate ratio in excess of 2:1 is employed, the weight of such reaction product should be increased accordingly. For example, if a ratio of 4:1 is used, it would be expected that, on the average, 50% of the polyol molecules would be unreacted and the other 50% would appear as 2:1 coupled polyols. On the other hand, if a ratio of less than 2:1 is utilized, the molecular weight of the coupled polyol will be higher; and the amount of such reaction product required for effective stabilization should be somewhat reduced. The description herein is predicated on the functionality of the polyisocyanate being 2, viz.—2 polyol molecules being coupled to one diisocyanate molecule. If a higher functionality polyisocyanate is used (e.g.—a polymeric isocyanate), the average molecular weight of the resulting coupled polyol will be somewhat higher requiring an adjustment in the amount of coupled polyol needed.

The polymer/polyols of this invention are produced by polymerizing the monomer system used in the presence of a free radical catalyst in the polyol mixture of the base and coupled polyols. The polymerization can also be carried out with an inert organic solvent present that does not dissolve the polymer. Illustrative of such solvents are xylol, toluene, benzene, acetonitrile, ethyl acetate, hexane, heptane, dicyclohexane, dioxane, acetone, N,N-dimethylformamide, N,N-dimethylacetamide, and the like, including those known in the art as being suitable solvents for the polymerization of vinyl monomers. The only requirement in the selection of the solvent and the polyol is that they do not interfere with the polymerization reaction. When an inert organic solvent is used, it is generally removed from the reaction mixture by conventional means before the polymer/polyol is used to produce polyurethane foams.

The polymer/polyols of the present invention are preferably produced utilizing the process set forth in the previously identified Priest et al. patent. In accordance with that process, a low monomer-to-polyol ratio is maintained throughout the reaction mixture during the process. This is achieved by employing process conditions that provide rapid conversion of monomer to polymer. In practice, a low monomer-to-polyol ratio is maintained, in the case of semi-batch and continuous operation, by control of the temperature and mixing conditions and, in the case of semi-batch operation, also by slowly adding the monomers to the polyol.

The temperature range is not critical and may vary from about 100° C. to about 150° C., or perhaps greater, the preferred range being from 115° C. to 135° C. As has been noted herein, the catalyst and temperature should be selected so that the catalyst has a reasonable rate of decomposition with respect to the hold-up time in the reactor for a continuous flow reactor or the feed time for a semi-batch reactor.

Catalysts useful in producing the polymer/polyol compositions of this invention are the free radical type of vinyl polymerization catalysts such as the peroxides, percarbonates and the azo compounds or any other suitable catalyst specified in the above-mentioned patents. Azo catalysts such as azobis (isobutyronitrile) are the preferred catalysts.

The catalyst concentration is not critical in most applications and can be varied within wide limits. As a representative range, the concentration can vary from about 0.1 to about 5.0 weight percent, based upon the total feed to the reactor. Up to a certain point, increases in the catalyst concentration result in increased monomer conversion but further increases do not substantially increase conversion. Conversions of monomers to polymers which can be typically achieved are on the order of 85 to 95% of the monomer charged. On the other hand, increasing catalyst concentration increasingly improves product stability. The catalyst concentration selected will usually be an optimum value considering all factors, including costs.

The mixing conditions employed are those attained using a back mixed reactor (e.g.—a stirred flask or stirred autoclave). Reactors of this type keep the reaction mixture relatively homogeneous and so prevent localized high monomer-to-polyol ratios.

The utilization of the Priest et al. process is preferred since this allows the preparation of polymer/polyols with a wide range of monomer compositions, polymer contents, and base polyol that could not be otherwise prepared with the necessary requisite stability. However, whether the utilization of the Priest et al. process is essential depends upon whether the process parameters are such that a satisfactory polymer/polyol can be prepared without using this process.

In addition, it should be appreciated that other of the previously mentioned prior techniques can be utilized in forming the polymer/polyols so long as the required product characteristics are not, of course, adversely affected to any significant extent. For example, there may be particular situations where it would be desirable to incorporate added unsaturation to the base polyol, such as by the addition of a minor amount of a glycidyl ether, such as allyl glycidyl ether, or by utilizing a more reactive double bond.

The polymer/polyols produced in accordance with this invention are characterized by highly desirable stability characteristics. The filtration and centrifugibility performance is indicative of such stability. The filtration characteristics are determined by passing a sample of the polymer/polyol by gravity, through, successively, two wire screens. The most stable polymer/polyols will pass completely through such screens (i.e., over 99 weight percent), and this type of performance is preferred. It may be suitable, however, in some applications to provide filtration performance down to 50% or even somewhat less.

Stability is also confirmed by the amount of material (cake) which is thrown down from samples placed in laboratory centrifuges. This is, in effect, an accelerated settling test, primarily, indicative of storage stability. In general, the lower the amount of centrifugible solids obtained, the more stable is the polymer/polyol.

From the functional standpoint, suitable polymer/polyols must be capable of: (1) being made, (2) stored, (3) shipped and (4) used without undue loss of polymer content or damage or fouling of the equipment in which it is made and handled. If a polymer/polyol meets these functional criteria, it is considered satisfactorily stable.

The present invention also provides a method for producing polyurethane products by reacting: (a) a polymer/polyol composition of this invention, (b) an organic polyisocyanate, and (c) a catalyst for the reaction of (a) and (b) to produce the polyurethane product, and, when a foam is being prepared, a blowing agent and a foam stabilizer. The reaction and foaming operations can be performed in any suitable manner, preferably by the one-shot technique.

The polymer/polyol may, if desired, be blended with conventional polyols or the like to reduce the polymer content to the level required for the particular end use application. Blends in which the resulting polymer content is as low as 4 percent of the total weight of the blend or even less are useful.

The organic polyisocyanates that are useful in producing polyurethane products in accordance with this invention are organic compounds that contain at least two isocyanate groups. Such compounds are well known in the art. Suitable organic polyisocyanates include the hydrocarbon diisocyanates, (e.g., the alkylene diisocyanates and the arylene diisocyanates) as well as known triisocyanates. As examples of suitable polyisocyanates, one can mention methylene bis(4-cyclohexyl isocyanate), MDI, polymeric MDI, 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)ether, bis(3-isocyanatopropyl)sulfide, 1,7-diisocyanatoheptane, 1,5-diisocyanato-2,2-dimethylpentane, 1,6-diisocyanato-3-methoxyhexane, 1,8-diisocyanatooctane, 1,5-diisocyanato-2,2,4-trimethylpentane, 1,9-diisocyanatononane, 1,10-diisocyanatopropyl)ether of 1,4-butylene glycol, 1,11-diisocyanatoundecane, 1,12-diisocyanatododecane bis(isocyanatohexyl)sulfide, 1,4-diisocyanatobenzene, 2,4-diisocyanatotoluene, 2,6-diisocyanato tolylene, 1,3-diisocyanato-o-xylene, 1,3-diisocyanato-m-xylene, 1,3-diisocyanato-p-xylene, 2,4-diisocyanato-1-chlorobenzene, 2,4-diisocyanato-1-nitrobenzene, and 2,5-diisocyanato-1-nitrobenzene and mixtures thereof.

Any known catalysts useful in producing polyurethanes may be employed. Representative catalysts include: (a) tertiary amines such as bis(dimethylaminoethyl)ether, trimethylamine, triethylamine, N-methylmorpholine, N-ethylmorpholine, N,N-dimethylbenzylamine, N,N-dimethylethanolamine, N,N,N',N'-tetramethyl-1,3-butanediamine, triethanolamine, 1,4-diazabicyclo[2.2.2]octane, pyridine oxide and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone-2-carboxylate, acetyl-acetoneimine, bis-acetylacetone-alkylenediimines, salicylaldehydeimine, and the like, with the various metals such as Be, Mg, Zn, Cd, Pb, Ti, Zr, Sn, As, Bi, Cr, Mo, Mn, Fe, Co, Ni, or such ions as $MoO_2++$, $UO_2++$, and the like; (f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, betadiketones, and 2-(N,N-dialkylamino)alkanols, such as the well known chelates of titanium obtained by said or equivalent procedures; (g) salts of organic acids with a variety of metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like; (h) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g. dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis (isopropoxide), dibutyltin-bis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above noted metal catalyst. Metal catalysts, or combinations of metal catalysts, may also be employed as the accelerating agents, without the use of amines. The catalysts are employed in small amounts, for example, from about 0.001 percent to about 5 percent, based on the weight of the reaction mixture.

When the product being formed is a polyurethane foam, this may be accomplished by employing a small amount of a polyurethane blowing gent, such as water, in the reaction mixture (for example, from about 0.5 to about 5 weight percent of water, based upon total weight of the polymer/polyol composition), or through the use of blowing agents which are vaporized by the exotherm of the reaction, or by a combination of the two methods. Illustrative polyurethane blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoromethane, hexafluorocyclobutane, octafluorocyclobutane, and the like. Another class of blowing agents include thermally unstable compounds which liberate gases upon heating, such as N,N'-dimethyl-N,N'-dinitrosoterephthalamide, and the like. The generally prefeerred method of foaming for producing flexible foams is the use of water or a combination of water plus a fluorocarbon blowing agent such as trichloromonofluoromethane. The quantity of blowing agent employed will vary with factors such as the density desired in the foamed product.

The anti-scorch properties of the foams produced using polymer/polyol compositions are most evident when at least some of the blowing agent is water and the water is used in an amount that results in a foam having a density less than 1.75 pounds per cubic foot. Generally, the use of water in an amount of at least 3.0 percent by weight based on the total weight of the polymer/polyol composition results in a foam having a density of less than 1.75 pounds per cubic foot.

It is also within the scope of the invention to employ small amounts, e.g., about 0.001 percent to 5.0 percent by weight, based on the total reaction mixture, of a foam stabilizer such as a "hydrolyzable" polysiloxane-polyoxyalkylene block copolymer such as the block copolymers described in the U.S. Pat. Nos. 2,834,748 and 2,917,480. Another useful class of foam stabilizers are the "non-hydrolyzable" polysiloxane-polyoxyalkylene block copolymers such as the block copolymers described in U.S. Pat. No. 3,505,377; U.S. Patent application Ser. No. 888,067, filed Dec. 24, 1969 and British Patent Specification No. 1,220,471. The latter class of copolymers differs from the above mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. These various polysiloxane-polyoxyalkylene block copolymers preferably contain from 5 to 50 weight percent of polysiloxane polymer with the remainder being polyoxyalkylene polymer.

The polyurethanes so produced may be utilized in foam and elastomer applications where any conventional type of polyurethane is or can be utilized.

The following Examples are illustrative of, but not in limitation of, the present invention. These Examples describe the preparation of coupled polyols, the use of coupled polyols in the preparation of polymer polyols and the preparation of polyurethane foams from such polymer/polyols.

DEFINITIONS

As used in the Examples appearing below, the following designations, symbols, terms and abbreviations have the indicated meanings: "Theoretical molecular weight" of a polyol denotes a molecular weight calculated using the equation previously set forth based on the functionality of the starter used to produce the polyol and the experimentally determined hydroxyl number of the polyol.

"Molecular weights" of polyols are number average molecular weights.

"rpm" denotes revolutions per minute.
"g" denotes grams.
"mg" denotes milligrams.
"TDI" denotes toluene diisocyanate.
"HMDI" denotes hexamethylene diisocyanate.
"MDI" denotes diphenylmethane 4,4'-diisocyanate.
"Desmodur W" denotes methylene bis(4-cyclohexyl isocyanate).
"VAZO-64P" denotes 2,2'-azobis(isobutyronitrile).
"TMSN" denotes tetramethylsuccinonitrile.
"pcf" denotes pounds per cubic feet.
"Sol" denotes solution.
"S" denotes solid.
"%" denotes percent by weight.
"wt" denotes weight.
"Ratio" denotes weight ratio.
"GPH" denotes gallons per hour.
"conc." denotes concentration.
"cks" denotes centistokes.
"cps" denotes centipoise.
"hr." denotes hour.
"sec." denotes seconds.
"calc." denotes calculated.
"ppm" denotes parts per million.
"T-12" denotes dibutyltindilaurate.

"Polyol I" is a polypropylene oxide triol (the designation of this and subsequent polyols as a "triol" or "diol" represents the nominal functionality based solely on the starter used; the actual functionality will be somewhat less) having about 10% external ethylene oxide content, a hydroxyl number of about 48 and a number average molecular weight of about 3300.

"Polyol II" is a polypropylene oxide diol having about 15% external ethylene oxide content, a hydroxyl number of about 38 and a number average molecular weight of about 2800.

"Polyol III" is a polypropylene oxide triol having about 14% internal ethylene oxide content, a hydroxyl number of about 47 and a number average molecular weight of about 3300.

"Polyol IV" is a polyol produced from sorbitol and glycerine having an external ethylene oxide content of about 15%, a hydroxyl number of about 28 and a number average molecular weight of about 7100.

"Polyol V" is a polypropylene oxide triol having an external ethylene oxide content of about 15%, a hydroxyl number of about 27 and a number average molecular weight of about 4400.

"Polyol VI" is a polypropylene oxide triol having an internal ethylene oxide content of about 14%, a hydroxyl number of about 24 and a number average molecular weight of about 5000.

"Polyol VII" is a polypropylene oxide triol having an internal ethylene oxide content of about 8%, a hydroxyl number of about 56 and a number average molecular weight of about 2800.

"Polyol VIII" is a polypropylene oxide triol having an internal ethylene oxide content of about 16.5%, a hydroxyl number of about 35 and a number average molecular weight of about 4000.

"Polyol IX" is a polypropylene oxide triol having an external ethylene oxide content of about 17%, a hydroxyl number of about 39 and a number average molecular weight of about 4200.

"Polyol X" is a polypropylene oxide triol having an internal ethylene oxide content of about 10%, a hydroxyl number of about 50 and a number average molecular weight of about 3100.

"Polyol XI" is a polypropylene oxide triol having an external ethylene oxide content of about 15%, a hydroxyl number of about 35 and a number average molecular weight of about 4000.

POLYMER/POLYOL PROPERTIES

Filtration Hindrance (Filterability)

This is determined by diluting one part by weight sample (e.g. —470 grams) of polymer/polyol with two parts by weight anhydrous isopropanol (e.g. —940 grams) to remove any viscosity-imposed limitations and using a fixed quantity of material in relation to a fixed cross-sectional area of screen (e.g. —1.8 sq. in.) such that about 200 grams of product are passed by gravity through 150 or 700-mesh screen per one square inch of screen. The difference between the final and initial screen weights corresponds to the amount of polymer that did not pass through the screens. The 700-mesh screen is made with a Dutch twill weave. The actual screen used had a nominal opening of 30 microns and is described in Bulletin 46267-R of the Ronningen-Petter Company of Kalamazoo, Michigan. The 150-mesh screen has a square mesh with average mesh openings of 105 microns, and it is a "Standard Tyler" 150 square mesh screen. The amount of solids that did not pass through the screens is reported as parts of solids per million parts of the original undiluted sample. The amount of sample which passes through the screens is reported in percent, a percentage of 100% being preferred. Trace solids will generally always be present, but a value of 100% indicates that over 90 weight percent passes through the screen.

Centrifugible Solids

After stripping unreacted monomer, the polymer/polyol composition is centrifuged for about 24 hours at about 3000 revolutions per minute and 1470 radial centrifugal "g" force. The centrifuge tube is then inverted and allowed to drain for 4 hours. The non-flowing cake remaining at the bottom of the tube is reported as weight percent of the initial weight of the composition tested. To provide a commercially satisfactory stable polymer/polyol, the solid should be less than about 10%, preferably less than about 5%.

PREPARATION OF COUPLED POLYOLS

Unless otherwise indicated, the coupled polyols were prepared generally as follows. The polyol and catalyst were charged to a reactor flask equipped with a mechanical agitator and maintained under a nitrogen atmosphere. The polyol was continuously agitated and heated to about 80° C. and then the diisocyanate was slowly added to the polyol. The reactants were maintained at a temperature of from about 70° to about 80° C. for two to four hours after the addition of the diisocyanate. Thereafter, the product was cooled and stored without further processing.

PREPARATION OF POLYMER/POLYOLS

Unless otherwise indicated, the polymer/polyols were prepared in a single-stage, continuous, back-mixed reactor having four internal equally spaced vertical baffles and equipped with a mechanical agitator. Two feed streams, one comprising a premix of the selected monomers and catalyst and the other comprising the polyol feed (the polyol feed consisting of base polyol and the coupled polyol) were added simultaneously through an in-line mixer to the reactor and agitated therein. The reactor was heated initially to a temperature of about 135° C. and then the temperature was adjusted to that shown in the Examples. The feeds were continued for 90 minutes line-out before the product was collected. Product collected from the reactor was stripped at 130° C. with a nitrogen sparge and then cooled to 35° C.

FOAM PREPARATION

Molded, water-blown, flexible polyurethane foams having an Index of 103 were prepared using polymer/polyols, 3.5 parts water and a polyisocyanate reactant comprising a mixture of tolylene diisocyanate and polymeric MDI at a weight ratio of, respectively, about 80 to 20.

Standard foam formulations comprising polymer/polyol, tin catalyst, surfactant, water and amine catalyst were converted to polyurethane foams using the following procedure. The polymer/polyol, tin catalyst and surfactant were charged to a ½ gallon paper container and mixed at 4000 rpm for 30 seconds with a 2.5 inch 6-blade turbine stirrer (placed one inch above the bottom of the container). Water and amine catalyst were added and mixing continued for an additional 55 seconds. Stirring was stopped for 25 seconds to de-gas. The polyisocyanate reactant was added and mixing continued for 5 seconds. The foaming mixture was poured quickly into a 15 inch × 15 inch × 4½ inch aluminum mold (mold temperature of about 120° F.) having four 1/16 inch vent holes drilled 5 inches diagonally from each corner in the lid. The mold was clamped and the foam was allowed to rise and gel. The foam was demolded after 8 minutes.

EXAMPLES 1-4

These Examples illustrate the preparation of coupled polyols utilizing Polyol I (Examples 1 and 2), and mixtures of Polyols I and II (Examples 3 and 4). Tolylene diisocyanate was the polyisocyanate used in each Example.

The specific process parameters used and the properties of the coupled polyols are set forth in Table I:

TABLE I

| Example No. | 1 | 2 | 3 | 4 |
|---|---|---|---|---|
| Polyol I, gm | 17561 | 17420 | 8274 | 6506 |
| Polyol II, gm | — | — | 8274 | 6506 |
| Temperature, °C. | 75-80 | 75-80 | 75-80 | 75-80 |
| Tolylene diisocyanate, gm | 439 | 580 | 452 | 473 |
| Time to feed TDI, hours | 0.5 | 0.75 | 1 | 0.25 |
| Mole ratio polyol: TDI | 2.10:1 | 3.16:2 | 2.10:1 | 3.16:2 |
| T-12 catalyst, ppm | 20 | 20 | 20 | 20 |
| Temperature, °C. | 75-80 | 75-80 | 75-80 | 75-80 |
| Time, hours | 2 | 2 | 3 | 4.5 |
| Viscosity, cks at 25° C. | | | | |
| after 1 hour | 4555 | 16653 | 7518 | 26874 |
| after 2 hours | 4542 | 16325 | 7589 | 28943 |
| after 4 hours | — | — | — | 28265 |
| Final analysis | | | | |
| Hydroxyl No., mg KOH/gm | 32.3 | 26.5 | 24.7 | 20.3 |
| theoretical | 31.4 | 25.9 | 24.9 | 19.1 |
| Acid No., mg KOH/gm | 0.02 | 0.06 | 0.04 | 0.02 |
| Viscosity, cks | | | | |
| at 25° C. | 4603 | 16325 | 7539 | 27200 |
| at 130° F. | 942 | 3034 | 1516 | 4770 |
| at 210° F. | 217 | 638 | 347 | 1004 |
| Primary hydroxyl, % | 48.3 | 47.2 | 52.4 | 45.2 |
| Functionality, theoretical | 3.6 | 4.3 | 2.6 | 2.9 |
| Molecular weight | 6253 | 9103 | 5905 | 8014 |

EXAMPLES 5-7

These Examples illustrate the preparation of coupled polyols using polyisocyanates other than tolylene diisocyanate. The specific process parameters used as well as the properties of the resulting coupled polyols are set forth in Table II:

TABLE II

| Example No. | 5 | 6 | 7 |
|---|---|---|---|
| Polyol: Type | VII | VII | VII |
| gm | 3696 | 3641 | 3648 |
| Isocyanate: Type | HMDI | Desmodur W | MDI |
| Mole ratio, polyol: isocyanate | 2.1:1 | 2.1:1 | 2.1:1 |
| Temperature, °C. | 70 | 75 | 75 |
| T-12 catalyst, ppm | 20 | 20 | 20 |
| Temperature, °C. | 80 | 80 | 80 |
| Time, hours | 4 | 7 | 3 |
| Viscosity, cks at 25° C. | | | |
| After 1 hour | 3150 | 4590 | 5785 |
| 3 hours | 3485 | — | 5754 |
| 4 hours | 3485 | 4980 | — |
| 7 hours | — | 5090 | — |
| Final analyses | | | |
| Hydroxyl No., mg KOH/gm | 37.5 | 37.0 | 37.9 |
| Theoretical | 38.2 | 37.7 | 37.7 |
| Acid No., mg KOH/gm | 0.02 | 0.01 | 0.06 |
| Color, °Pt-Co | 20 | 20 | 20 |
| Viscosity, cks | | | |
| At 25° C. | 3468 | 5098 | 5724 |
| 40° C. | 1429 | 2009 | 2224 |
| 130° F. | 932 | 998 | 1094 |
| Functionality, theoretical[1] | 3.7 | 3.7 | 3.7 |
| Molecular Weight | 5535 | 5610 | 5477 |

[1]Assumes a functionality of 2.9 for Polyol VII and an isocyanate purity of 100%.

EXAMPLES 8–18

These Examples illustrate the preparation of polymer/polyols utilizing the present invention and, for comparative purposes, polymer/polyols made with a blend of Polyol III and particular high molecular weight polyols. No comparative example is set forth using Polyol III by itself since, under the conditions set forth herein, a stable polymer/polyol could not be prepared.

Examples 8–15 illustrate the preparation of polymer/polyols using a polyol mixture of Polyol III as the base polyol and coupled polyols from prior Examples at a weight ratio, respectively, of 85 to 15. Examples 16–18 are illustrative of polymer/polyols made from blends of Polyol III and the indicated high molecular weight polyols (made by conventional techniques) in the same weight ratio used for Examples 8–15.

The specific process parameters as well as the properties of the polymer/polyols are set forth in Table III:

TABLE III

| Example No. | 8 | 9 | 10 | 11 | 12 | 13 | 14 | 15 | 16 | 17 | 18 |
|---|---|---|---|---|---|---|---|---|---|---|---|
| Polyol Mixture | | | | | | | | | | | |
| Base Polyol (85 wt. %) | III | III | III | III | III | III | III | III | III | III | III |
| High Molecular Weight Polyol (15 wt. %) | | | | | | | | | | | |
| Type | Ex. 1[1] | Ex. 2[1] | Ex. 3[1] | Ex. 4[1] | Ex. 19[1] | Ex. 5[1] | Ex. 6[1] | Ex. 7[1] | IV[2] | V[2] | VI[2] |
| Molecular Weight | 6253 | 9103 | 5905 | 8014 | 6243 | 5535 | 5610 | 5477 | 7136 | 4412 | 4963 |
| Hydroxyl No., mg KOH/gm | 32.3 | 26.5 | 24.7 | 20.3 | 32.8 | 37.5 | 37.0 | 37.9 | 28.3 | 26.7 | 24.3 |
| Viscosity at 25° C., cks | 4603 | 16325 | 7539 | 27200 | 4840 | 3468 | 5098 | 5724 | — | — | 1450 |
| Polyol Mixture, Brookfield Viscosity at 25° C., cps | 750 | 1015 | 833 | 1073 | 828 | 786 | 782 | 819 | 635 | 603 | 713 |
| Reaction Temperature, °C. | 125.0 | 124.0 | 126.0 | 126.2 | 124.0 | 123.7 | 124.5 | 124.0 | 125.2 | 125.0 | 126.0 |
| VAZO-64P Conc., wt % of total feed | 0.410 | 0.413 | 0.411 | 0.414 | 0.404 | 0.410 | 0.409 | 0.406 | 0.412 | 0.402 | 0.406 |
| Monomer + VAZO-64P, wt % of total feed | 22.54 | 22.69 | 22.60 | 22.75 | 22.20 | 22.54 | 22.48 | 22.32 | 22.62 | 22.08 | 22.31 |
| Ratio of Acrylonitrile/Styrene (wt/wt) | 40/60 | | | | | | | | | | |
| Polyol Feed Rate, gm/hr | 2151 | 2126 | 2161 | 2098 | 2138 | 2140 | 2145 | 2104 | 2141 | 2139 | 2141 |
| Monomer + VAZO-64P Feed Rate, gm/hr | 626 | 624 | 631 | 618 | 610 | 622 | 622 | 605 | 626 | 606 | 615 |
| Residual: | | | | | | | | | | | |
| Acrylonitrile, wt % | 1.13 | 1.56 | 1.66 | 1.53 | 1.52 | 1.34 | 1.52 | 1.53 | 1.25 | 1.23 | 1.32 |
| Styrene, wt % | 1.13 | 1.53 | 1.62 | 1.57 | 1.50 | 1.32 | 1.47 | 1.51 | 1.14 | 1.28 | 1.31 |
| TMSN, wt% | 0.19 | 0.12 | 0.13 | 0.15 | 0.14 | 0.10 | 0.13 | 0.14 | 0.15 | 0.17 | 0.08 |
| Conversions: | | | | | | | | | | | |
| Acrylonitrile, wt % | 87.3 | 82.6 | 81.4 | 82.9 | 82.7 | 84.9 | 82.8 | 82.6 | 86.0 | 85.8 | 85.0 |
| Styrene, wt % | 91.5 | 88.6 | 87.9 | 88.3 | 88.6 | 90.1 | 88.9 | 88.6 | 91.5 | 90.2 | 90.1 |
| Combined wt % | 89.8 | 86.2 | 85.3 | 86.1 | 86.2 | 88.0 | 86.5 | 86.2 | 89.3 | 88.5 | 88.0 |
| Total Polymer, wt % by calc. | 20.35 | 19.82 | 19.57 | 19.87 | 19.39 | 20.00 | 19.40 | 19.50 | 20.33 | 19.68 | 19.82 |
| Hydroxyl No., mg KOH/gm by calc. | 36.0 | 35.5 | 35.5 | 34.8 | 36.1 | 36.4 | 36.7 | 36.7 | 35.1 | 33.1 | 34.9 |
| Brookfield Viscosity at 25° C., No. 3 spindle/30rpm,cps | 1860 | 2400 | 2072 | 2708 | 1865 | 1880 | 1940 | 2140 | 1520 | 1672 | 1678 |
| Centrifugible Solids, wt % | 7.46 | 4.78 | 7.01 | 5.22 | 6.09 | 5.56 | 8.05 | 8.14 | 9.09 | 11.18 | 12.55 |
| Filterability: | | | | | | | | | | | |
| 150 mesh, % through screen | 100 | 100 | 100 | 100 | 100 | 100 | 100 | 100 | 100 | 100 | 100 |
| solids on screen, ppm | 26 | 26 | 25 | 33 | 13 | 13 | 63 | 17 | 41 | 25 | 34 |
| 700 mesh, % through screen | 100 | 100 | 100 | 100 | 100 | 100 | 100 | 100 | 100 | 100 | 100 |
| solids on screen, ppm | 11 | 22 | 36 | 17 | 9 | 17 | 18 | 8 | 13 | 33 | 14 |

[1] Coupled polyol made in the indicated Example.
[2] Polyol made by conventional techniques and defined above.

The centrifugibility of the polymer/polyols was determined in accordance with the procedure set forth above. Similarly, the filterability of the polymer/polyols was determined as set forth above using 200 gms of unstripped sample diluted with 400 grams of anhydrous isopropanol and screens each having an area of about 1.8 square inches.

As can be seen from the above results, the polymer/polyols made in accordance with the present invention tend to have lower centrifugible solids levels than the polymer/polyols utilizing polyols made by conventional techniques. Moreover, such conventional techniques would be expected to result in diminution of the functionality of the polymer/polyols (in contrast to the functionality of the polymer/polyols made pursuant to the present invention) which could well adversely affect certain physical properties, such as static fatigue, in derived polyurethane foams.

EXAMPLE 19

This Example illustrates a relatively large scale production of coupled polyol formed by the reaction of 2 moles of Polyol X with 1 mole of tolylene diisocyanate.

A 100-gallon, glass-lined, steel reactor, equipped with a three-blade, retreat-curve, 24-inch diameter impeller was used. This was operated at 190 rpm to agitate the feed, 828 pounds of Polyol XI. The polyol was heated to 70° C.–80° C. under a nitrogen atmosphere. Tolylene diisocyanate was next added to the reactor through a pump rated at 9.8 GPH at a rate such that 22.0 pounds of the isocyanate was charged within 45 minutes. Then 7.7 gm of T-12 catalyst, equivalent to 20 ppm, were added; and the reaction temperature increased from 73° C. to 79° C. The reaction temperature was maintained at a temperature of about 77°–78° C. for 2.5 hours. The reaction product was then cooled and stored.

The coupled polyol thus prepared had a hydroxyl number of 32.8 mg KOH/gm, a viscosity at 25° C. of 4840 cks and a functionality of 3.9.

EXAMPLES 20-28

These Examples illustrate the preparation of coupled polyols following the procedure set forth above using tolylene diisocyanate and Polyols VIII, IX and XI at various mole ratios of polyol to isocyanate. The reaction parameters and coupled polyol properties are set forth in Table IV:

TABLE IV

| Example No. | 20 | 21 | 22 | 23 | 24 | 25 | 26 | 27 | 28 |
|---|---|---|---|---|---|---|---|---|---|
| Polyol, Type | VIII | VIII | VIII | VIII | XI | IX | IX | IX | IX |
| gm | 16,901 | 17,942 | 16,901 | 16,901 | 16,901 | 16,892 | 17,942 | 16,892 | 16,892 |
| T-12 catalyst, ppm | 20 | 20 | 20 | 19 | 20 | 20 | 20 | 20 | 20 |
| Temperature, °C. | 70 | 70 | 70 | 70–75 | 70 | 70 | 70 | 70 | 65 |
| TDI, gm | 179 | 57.2 | 179 | 179 | 179 | 108 | 57.2 | 108 | 108 |
| Time to feed TDI, hours | 1.0 | 1.0 | 1.25 | 1.0 | 1.0 | 1.0 | 1.0 | 1.0 | 1.0 |
| Mole ratio Polyol: Isocyanate | 4.0:1 | 13.4:1 | 4.0:1 | 4.1:1 | 3.9:1 | 6.7:1 | 13.4:1 | 6.7:1 | 6.7:1 |
| Temperature, °C. | 80 | 80 | 80 | 80 | 80 | 80 | 80 | 80 | 80 |
| Time, hours | 2 | 2 | 2 | 3 | 3 | 3 | 3 | 3 | 3 |
| Analyses | | | | | | | | | |
| Hydroxyl No., mg KOH/gm | 28.6 | 33.3 | 28.6 | 28.6 | 26.2 | 35.3 | 37.4 | 34.8 | 34.8 |
| theoretical | 28.6 | 33.5 | 28.6 | 29.2 | 27.5 | 34.4 | 36.5 | 34.4 | — |
| Viscosity, cks at 25° C. | 2417 | 1086 | 2385 | 21197 | 3627 | 1358 | 995 | 1370 | 1372 |
| Acid No., mg KOH/gm | 0.008 | 0.009 | 0.008 | 0.020 | 0.013 | 0.016 | 0.009 | 0.012 | 0.011 |
| Functionality, theoretical | 2.9 | 2.6 | 2.9 | 2.8 | 2.8 | 2.9 | 2.8 | 2.9 | 3.1 |
| Molecular Weight | 5688 | 4380 | 5688 | 5496 | — | 4609 | 4200 | 4675 | 4997 |

[1]The molecular weight is calculated from the measured hydroxyl number and theoretical functionality of the coupled polyol.

Since all of the polyol to isocyanate ratios used are in excess of 2:1, unmodified polyol molecules will be present as well as coupled polyol molecules. As can be seen, as such ratios increase, the relative amount of unmodified polyol molecules likewise increase; and the viscosity of the mixture decreases.

EXAMPLES 29-40

These Examples illustrate the comparison of polymer/polyols made only using Polyol VIII with polymer/polyols made in accodance with the present invention at acrylonitrile to styrene ratios ranging from 50:50 to 30:70.

The reaction parameters and resulting polymer/polyol properties are set forth in Table V:

TABLE V

| Example No. | 29 | 30 | 31 | 32 | 33 | 34 | 35 | 36 | 37 | 38 | 39[5] | 40 |
|---|---|---|---|---|---|---|---|---|---|---|---|---|
| Base Polyol Blend: | | | | | | | | | | | | |
| Base Polyol Type | VIII | VIII | VIII | VIII | VIII | VIII | VIII | VIII | VIII | VIII | VIII | VIII |
| Base Polyol wt. % | 100 | 69.6 | 39.3 | | | | 85.8 | 70 | 40 | 39.3 | 29.3 | 18.7 |
| Coupled Polyol Reaction Product | — | Ex. 20 | Ex. 20 | — | — | — | Ex. 22 | Ex. 20 | Ex. 20 | Ex. 23 | Ex. 20 | Ex. 23 |
| wt. % | — | 30.4 | 60.7 | — | — | — | 14.2 | 30 | 60 | 60.7 | 60.7 | 81.3 |
| Wt. % coupled polyol in reaction product[1] | — | 50 | 50 | — | — | — | 50 | 50 | 50 | 50 | 50 | 50 |
| Wt. % coupled polyol in blend[2] | — | 15.2 | 30.4 | — | — | — | 7.1 | 15 | 30 | 30.4 | 30.4 | 40.7 |
| Brookfield Viscosity at 25° C., cps | 813 | 1110 | 1650 | 813 | 813 | 813 | 953 | 1110 | 1650 | 1478 | 1650 | 1738 |
| Calc. Hydroxyl No., mg KOH/gm | 34.8 | 32.9 | 31.0 | 34.8 | 34.8 | 34.8 | 33.9 | 32.9 | 31.0 | 31.1 | 31.0 | 29.8 |
| Reaction Temperature, °C. | 125 | 125 | 135 | 125 | 125 | 125 | 125 | 125 | 125 | 125 | 124 | 125 |
| Catalyst conc., wt. % of total feed[3] | 0.66 | 0.65 | — | 0.71 | 0.89 | 0.65 | 0.65 | 0.66 | — | 0.67 | 0.66 | 0.66 |
| Monomer + catalyst, wt. % of total feed | 27.1 | 26.7 | 26.1 | 26.1 | 26.1 | 26.8 | 26.25 | 26.90 | — | 21.80 | 22.16 | 21.38[6] |

TABLE V-continued

| Example No. | 29 | 30 | 31 | 32 | 33 | 34 | 35 | 36 | 37 | 38 | 39[5] | 40 |
|---|---|---|---|---|---|---|---|---|---|---|---|---|
| Ratio of Acrylonitrile styrene (wt/wt) | 50/50 | 50/50 | 50/50 | 40/60 | 40/60 | 40/60 | 40/60 | 40/60 | 40/60 | 30/70 | 30/70 | 30/70 |
| Polyol feed rate, gm/hr. | 2010 | 2012 | — | 2066 | 2051 | 2038 | 2062 | 2022 | — | 2152 | 2133 | 2162 |
| Monomer + Catalyst feed rate (gm/hr) | 750 | 732 | — | 738 | 745 | 746 | 734 | 744 | — | 600 | 607 | 588 |
| Residual: | | | | | | | | | | | | |
| Acrylonitrile, wt. % | 1.66 | 1.51 | — | 1.24 | 1.20 | 1.26 | 1.36 | 1.13 | — | 0.88 | — | 0.95 |
| Styrene, wt. % | 0.83 | 0.79 | — | 1.36 | 1.24 | 1.41 | 1.40 | 1.91 | — | 2.16 | — | 2.15 |
| TMSN, wt. % | 0.24 | 0.22 | — | 0.31 | 0.35 | 0.27 | 0.26 | 0.30 | — | 0.25 | — | 0.27 |
| Conversions: | | | | | | | | | | | | |
| Acrylonitrile, wt. % | 87.6 | 88.5 | — | 88.0 | 88.3 | 88.0 | 86.7 | 89.3 | — | 86.1 | 85.9 | 84.7 |
| Styrene, wt. % | 93.8 | 94.0 | — | 91.2 | 92.0 | 91.1 | 90.0 | 87.9 | — | 85.4 | 86.4 | 85.1 |
| Combined, wt. % | 90.7 | 91.2 | — | 90.0 | 90.5 | 89.9 | 89.2 | 88.5 | — | 85.6 | 86.2 | 85.0 |
| Total Polymer, wt. %, by calc. | 24.68 | 24.32 | 24[6] | 23.67 | 23.93 | 24.16 | 23.52 | 23.97 | — | 18.68 | 19.13 | 18.18 |
| Hydroxyl No., mg KOH/gm | 26.21 | 26.68 | — | 26.6 | 26.5 | 26.4 | 25.9 | 25.0 | — | 25.30 | 25.10 | 24.37 |
| Brookfield Viscosity at 25° C., No. 3 spindle/12 rpm, cps | 2250 | 3110 | 4530 | 2420 | 2390 | 2540 | 2920 | 3340 | 4320 | 4400 | 5230 | 4880 |
| Centrifugible Solids, wt. %[4] | 6.78 | 3.36 | 2.09 | 9.40 | 8.01 | 8.56 | 6.75 | 9.95 | 3.94 | 9.87 | 7.38 | 7.23 |
| Filterability[5], | | | | | | | | | | | | |
| 150 mesh, % through screen | 100 | 100 | — | 100 | 100 | 100 | 100 | 100 | 100 | 100 | 100 | 100 |
| 700 mesh, % through screen | 100 | 100 | — | 5.7 | 32.7 | 9.8 | 19 | 8.8 | 100 | 21.3 | 100 | 49.5 |

[1]Based on a 2:1 mole ratio of Polyol to TDI.
[2]This is the product obtained by multiplying the wt. % coupled polyol in the reaction product by the wt. % of the coupled polyol reaction product.
[3]The catalyst is azobis(isobutyronitrile).
[4]Determined according to the procedure described above using a 200 gram unstripped sample diluted with 400 grams of anhydrous isopropanol and screens of 1.8 square inches.
[5]This example is included for sake of completeness. The results are not considered representative in view of the results shown in Examples 38 and 40.
[6]Estimated from monomer feed and expected conversion.

Samples of polymer/polyol prepared in Examples 29–40 were molded into flexible polyurethane foams in accordance with the procedure previously described. All foams were tested for combustibility, according to MVSS-302, and all foams passed the standards required. Foams samples prepared from polymer/polyols made in accordance with the present invention (viz.—Examples 38 and 40), when diluted to a polymer content of 16 wt.% by addition of further base polyol, did not even burn to the 1½ inch bench mark prescribed by MVSS-302.

With regard to the properties of the polymer/polyols set forth in Table V, the 50 acrylonitrile: 50 styrene polymer/polyols of Examples 30 and 31 exhibit decreased centrifugible solids levels relative to the control, the polymer/polyol of Example 29. A comparison of the 40 acrylonitrile:60 styrene polymer/polyol control, Example 34, with the polymer/polyols of Examples 35–37 shows the tendency of increasing amounts of the coupled polyol in improving the filterability and centrifugible solids level.

EXAMPLES 41–50

These Examples illustrate the preparation of coupled polyols by the in situ method previously described and the use of the resulting coupled polyol reaction product in forming polymer/polyols without further dilution.

The reaction parameters and properties of the polymer/polyols are set forth in Table VI:

TABLE VI

| Example No. | 41 | 42 | 43 | 44 | 45 | 46 | 47 | 48 | 49 | 50 |
|---|---|---|---|---|---|---|---|---|---|---|
| Base Polyol Type | — | — | IX | IX | — | — | — | — | — | — |
| Base Polyol wt. % | 0 | 0 | 100 | 100 | 0 | 0 | 0 | 0 | 0 | 0 |
| Coupled Polyol reaction product | Ex. 21 | Ex. 21 | — | — | Ex. 26 | Ex. 27 | Ex. 27 | Ex. 28 | Ex. 28 | Ex. 28 |
| Wt. % | 100 | 100 | — | — | 100 | 100 | 100 | 100 | 100 | 100 |
| Wt. % coupled polyol in reaction product | 14.9 | 14.9 | — | — | 14.9 | 29.9 | 29.9 | 29.9 | 29.9 | 29.9 |
| Wt. % coupled polyol used[2] | 14.9 | 14.9 | — | — | 14.9 | 29.9 | 29.9 | 29.9 | 29.9 | 29.9 |
| Brookfield viscosity at 25° C., cps | 1075 | 1075 | 718 | 718 | 970 | 1330 | 1330 | 1398 | 1398 | 1398 |
| Calc. Hydroxyl No., mg KOH/gm | 34.8 | 34.8 | 39.9 | 39.9 | 37.4 | 34.8[5] | 34.8[5] | 34.8[5] | 34.8[5] | 34.8[5] |
| Reaction Temperature, °C. | 125 | 125 | 125 | 125 | 125 | 124 | 125 | 125 | 125 | 125 |
| Catalyst conc. wt. % of total feed[3] | 0.66 | 0.65 | 0.76 | 0.74 | — | 0.76 | 0.77 | 0.75 | 0.75 | 0.75 |
| Monomer + catalyst wt. % of total feed | 26.88 | 26.61 | 26.73 | 26.65 | — | 26.52 | 23.55 | 23.10 | 23.08 | 23.36 |
| Ratio of acrylonitrile/stryene (wt/wt) | 50/50 | 40/60 | 40/60 | 40/60 | 40/60 | 40/60 | 30/70 | 50/50 | 40/60 | 30/70 |
| Polyol feed rate, gm/hr. | 2024 | 2030 | 2017 | 2040 | — | 2034 | 2117 | 2114 | 2096 | 2096 |
| Monomer + catalyst feed rate (gm/hr) | 744 | 738 | 736 | 741 | — | 734 | 656 | 635 | 629 | 639 |
| Residual: | | | | | | | | | | |
| Acrylonitrile, wt. % | 1.55 | 1.21 | 1.07 | 1.09 | — | 1.00 | 0.85 | 1.39 | 1.14 | 0.90 |
| Styrene, wt. % | 0.83 | 1.41 | 1.41 | 1.13 | — | 1.08 | 2.37 | 0.72 | 1.13 | 2.16 |
| TMSN, wt. % | 0.27 | 0.47 | 0.28 | 0.33 | — | 0.33 | 0.27 | 0.23 | 0.26 | 0.27 |
| Conversions: | | | | | | | | | | |
| Acrylonitrile, wt. % | 88.21 | 88.41 | 89.8 | 89.47 | — | 90.5 | 87.6 | 88.55 | 87.26 | 86.76 |
| Styrene, wt. % | 93.69 | 91.00 | 91.0 | 92.72 | — | 93.2 | 85.2 | 93.55 | 91.58 | 86.38 |
| Combined, wt. % | 90.95 | 89.96 | 90.5 | 91.42 | — | 92.1 | 85.9 | 90.55 | 89.86 | 86.49 |
| Total Polymer, wt. %, by conc. | 24.46 | 24.06 | 24.13 | 24.25 | 24[6] | 24.25 | 20.24 | 20.70 | 20.56 | 20.19 |
| Hydroxyl No., mg KOH/gm | 26.29 | 26.42 | 24.13 | 30.22 | — | 24.25 | 27.76 | 27.60 | 27.65 | 27.77 |
| Brookfield viscosity at 35° C., No. 3 spindle/12 rpm, cps | 3020 | 3150 | 2450 | 2210 | 2900 | 3940 | 3690 | 3310 | 3410 | 3810 |
| Centrifugible solids, wt. % | 2.90 | 4.60 | 11.49 | 8.86 | 5.98 | 5.21 | 7.50 | 2.04 | 2.62 | 6.13 |
| Filterability, | | | | | | | | | | |
| 150 mesh, % through screen | — | 100 | 100 | 100 | 48.8 | 100 | 100 | 100 | 100 | 100 |

TABLE VI-continued

| Example No. | 41 | 42 | 43 | 44 | 45 | 46 | 47 | 48 | 49 | 50 |
|---|---|---|---|---|---|---|---|---|---|---|
| 700 mesh, % through screen | — | 100 | 0.5 | 38.7 | 0.83 | 55.8 | 94.7 | 100 | 100 | 100 |

[1] Based on a mole ratio of polyol: isocyanate as set forth in Table IV.
[2] This is the product obtained by multiplying the wt. % coupled polyol in the reaction product by the wt. % of the coupled polyol reaction product.
[3] The catalyst is azobis(isobutyronitrile).
[4] Determined according to the procedure described above using a 200 gram unstripped sample diluted with 400 grams of anhydrous isopropanol and screens of 1.8 square inches.
[5] Measured.
[6] Estimated from monomer feed and expected conversion.

Samples of polymer/polyol prepared in Examples 41–50 were molded into flexible polyurethane foams in accordance with the procedure previously described. All samples were then tested for combustibility as described in conjunction with Examples 29–40. All samples met the standards required. The samples made from the polymer/polyols of Examples 46 (diluted to reduce the polymer content to 21 wt.%), 47 and 50 did not even burn to the 1½ inch bench mark prescribed.

A comparison of the viscosities of the in situ produced coupled polyols with the viscosities of the coupled polyol reaction products made in prior Examples (diluted to the same coupled polyol level) show the tendency for somewhat lower viscosities obtained with the in situ technique. Further, the reduction in the polymer content to about 20 wt.% (in comparison to the higher level in Examples 20–29) allowed preparation of polymer/polyols of quite satisfactory stability at acrylonitrile to styrene weight ratios ranging from 50:50 to 30:70.

EXAMPLE 51

This Example illustrates the preparation of a polymer/polyol with a relatively high polymer content.

The reaction parameters and properties of the polymer/polyol are set forth in Table VII:

TABLE VII

| Example No. | 51 |
|---|---|
| Base Polyol Blend: | |
| Base Polyol Type | X |
| Base Polyol wt. % | 93 |
| Coupled Polyol Reaction Product wt. % | Ex. 19<br>7 |
| Wt. % Coupled Polyol in reaction product[1] | 95.2 |
| Wt. % Coupled Polyol in Blend[2] | 6.7 |
| Brookfield viscosity at 25° C., cps | 558 |
| Calc. Hydroxyl No., mg KOH/gm | 49.3 |
| Reaction Temperature, °C. | 125 |
| Catalyst conc., wt. % of total feed[3] | 0.50 |
| Monomer + catalyst, wt. % of total feed | 34.41 |
| Ratio of Acrylonitrile/Styrene (wt/wt) | 72/28 |
| Polyol feed rate, gm/hr. | 1828 |
| Monomer + catalyst, feed rate (gm/hr) | 959 |
| Residual: | |
| Acrylonitrile, wt. % | 1.29 |
| Styrene, wt. % | 0.15 |
| TMSN, wt. % | 0.17 |
| Conversions: | |
| Acrylonitrile, wt. % | 94.8 |
| Styrene, wt. % | 98.2 |
| Combined, wt. % | 95.7 |
| Total Polymer, wt. %, by calc. | 33.48 |
| Hydroxyl No., mg KOH/gm | 32.77 |
| Brookfield Viscosity at 25° C., No. 3 spindle/12 rpm, cps | 2840 |
| Centrifugible Solids, wt. %[4] | 7.89 |
| Filterability, | |
| 150 mesh, % through screen | 100 |

TABLE VII-continued

| Example No. | 51 |
|---|---|
| 700 mesh, % through screen | 100 |

[1] Based on a 2:1 mole ratio of polyol to TDI.
[2] This is the product obtained by mulitplying the wt. % coupled polyol in the reaction product by the wt. % of the coupled polyol reaction product.
[3] The catalyst is azobis(isobutyronitrile).
[4] Determined according to the procedure described above using a 200 gram unstripped sample diluted with 400 grams of anhydrous isopropanol and screens of 1.8 square inches.

As can be seen, the polymer content of the polymer/polyol is calculated to be over 33 percent by weight, the filterability characteristics are excellent and the centrifugible solids level acceptable.

Thus, as has been seen, the present invention provides a method for preparing stable polymer/polyols by a facile synthesis not requiring and substantial economic penalty. Utilizing this invention, polymer/polyols can be made with extremely high polymer contents for use in applications requiring high load capabilities. Further, stable polymer/polyols can be prepared which are capable of conversion to virtually scorch-free, slab-stock foam at densities lower than 1.75 pounds per cubic foot. Indeed, employing some formulations, polyurethane foams can be made that satisfy even highly rigorous interpretations of desired combustibility resistance, as determined by MVSS-302, the standard for foam used in motor vehicle applications.

The desirability of the present invention resides in the fact that such facile preparation of stable polymer/polyols is achieved without the need to resort to the inclusion of materials likely to be harmful to desired polyurethane characteristics. More specifically, the formation of the coupled polyols utilized in this invention simply carries out reactions that would eventually occur upon conversion of the polymer/polyol to a polyurethane, reordered in a time sequence to achieve the considerable benefits described herein. This is in marked contrast to prior techniques which either do not allow a facile preparation of the polymer/polyol in the first instance, or require the inclusion of materials that will impart adverse effects when such polymer/polyols are converted to polyurethanes.

What is claimed is:

1. A normally liquid, stable polymer/polyol composition formed by polymerizing, in the presence of a free radical catalyst, (1) from about 10 to about 50 weight percent of a mixture of acrylonitrile and an ethylenically unsaturated comonomer or comonomers in a weight ratio, respectively, of from about 80:20 to about 20:80, dissolved or dispersed in (2) from about 50 to about 90 weight percent of a polyol mixture comprising (a) a base polyol having a number average molecular weight of at least about 500 and (b) a coupled polyol consisting essentially of the reaction product of a polyol having a functionality in excess of 2 reacted with a polyisocyanate in such proportion that the ratio of hydroxyl groups to isocyanato groups is greater than 1, the coupled polyol being present in an amount sufficient to stabilize the resulting polymer/polyol.

2. The polymer/polyol composition of claim 1 wherein styrene is the comonomer and the weight percent of the mixture of acrylonitrile and styrene is in the range of from about 30 to about 40.

3. The polymer/polyol composition of claim 2 wherein the weight ratio of acrylonitrile to styrene is in the range of from about 80:20 to about 50:50.

4. The polymer/polyol composition of claim 1 wherein styrene is the comonomer and the weight ratio of acrylonitrile to styrene is in the range of from about 40:60 to 20:80.

5. The polymer/polyol composition of claim 1 wherein styrene is the comonomer and the weight ratio of acrylonitrile to styrene is in the range of from about 30:70 to 20:80.

6. The polymer/polyol composition of claim 1 wherein the base polyol is a poly(oxypropylene) polyol.

7. The polymer/polyol composition of claim 6 wherein the poly(oxypropylene) polyol has a nominal functionality in the range of from about 3 to about 4 and a hydroxyl number of from about 25 to about 70.

8. The polymer/polyol composition of claim 1 wherein the polyol reacted with the polyisocyanate to form the coupled polyol has a functionality in the range of from about 2.5 to about 4.

9. The polymer/polyol composition of claim 8 wherein the polyisocyanate is toluene diisocyanate.

10. The polymer/polyol composition of claim 1 wherein the polyisocyanate is toluene diisocyanate.

11. The polymer/polyol composition of claim 1 wherein the ratio of hydroxyl groups to isocyanato groups is 2:1 or greater.

12. The polymer/polyol composition of claim 1 wherein the coupled polyol, based upon the total weight of the base and coupled polyols, is present in an amount of from about 5 to about 50 weight percent with the mole ratio of the polyol constituent of the coupled polyol to the polyisocyanate being about 2:1.

13. The polymer/polyol composition of claim 1 wherein the polyol reacted with the polyisocyanate is identical to the base polyol.

14. A process for producing a normally liquid, stable polymer/polyol composition which comprises: (a) providing a polyol mixture comprising (1) a base polyol having a number average molecular weight of at least about 500 and (2) a coupled polyol consisting essentially of the reaction product of a polyol having a functionality in excess of 2 reacted with a polyisocyanate in such proportion that the ratio of hydroxyl groups to isocyanato groups is greater than 1, (b) dissolving or dispersing from about 10 to about 50 weight percent of a mixture of acrylonitrile and a comonomer or comonomers in a weight ratio, respectively, of from about 80:20 to about 20:80 in from about 50 to about 90 weight percent of said polyol mixture, and (c) polymerizing the mixture of acrylonitrile and styrene dissolved or dispersed in said polyol mixture in the presence of a free radical catalyst, said coupled polyol being present in an amount sufficient to stabilize the resulting polymer/polyol.

15. The process for producing the normally liquid, stable polymer/polyol composition of claim 14 wherein said coupled polyol is formed in situ in the base polyol by addition thereto of an amount of said polyisocyanate sufficient to form the required proportion of coupled polyol prior to step (b).

16. The process for producing the normally liquid, stable polymer/polyol composition of claim 15 wherein styrene is the comonomer and the weight percent of the mixture of the acrylonitrile and styrene is in the range of from about 30 to about 40.

17. The process for producing the normally liquid, stable polymer/polyol composition of claim 16 wherein the weight ratio of acrylonitrile to styrene is in the range of from about 80:20 to about 50:50.

18. The process for producing the normally liquid, stable polymer/polyol composition of claim 15 wherein styrene is the comonomer and the weight ratio of acrylonitrile to styrene is in the range of from about 40:60 to about 20:20.

19. The process of producing the normally liquid, stable polymer/polyol composition of claim 15 wherein styrene is the comonomer and the weight ratio of acrylonitrile to styrene is in the range of from about 30:70 to about 20:80.

20. The process for producing the normally liquid, stable polymer/polyol composition of claim 15 wherein the base polyol is a poly(oxypropylene) polyol.

21. The process for producing the normally liquid, stable polymer/polyol composition of claim 20 wherein the poly(oxypropylene) polyol has a nominal functionality of from about 3 to about 4 and a hydroxyl number of from about 25 to about 70.

22. The process for producing the normally liquid, stable polymer/polyol composition of claim 15 wherein the polyisocyanate is toluene diisocyanate.

23. The process for producing the normally liquid, stable polymer/polyol composition of claim 15 wherein the coupled polyol is present in an amount of from about 5 to about 50 percent, based upon the total weight of the base and coupled polyols.

24. A method for producing a polyurethane foam by reacting and foaming a mixture comprising (a) the polymer/polyol composition claimed in claim 1, (b) an organic polyisocyanate, (c) a catalyst for the reaction of (a) and (b) to produce the polyurethane, (d) a blowing agent and (e) a foam stabilizer.

25. A method as claimed in claim 24 wherein the foam is a flexible foam, the reaction and foaming are performed by the one shot technique, the polymer/polyol composition is as claimed in claim 6, the blowing agent is water and the water is used in an amount to provide a foam having a density of about 1.75 pounds per cubic foot or less.

26. A method as claimed in claim 25 wherein the polymer/polyol composition is as claimed in claim 5.

27. A method as claimed in claim 24 wherein the polymer/polyol composition is as claimed in claim 2.

28. A method as claimed in claim 24 wherein the polymer/polyol composition is as claimed in claim 7.

29. A method as claimed in claim 24 wherein the polymer/polyol composition is as claimed in claim 8.

30. A method as claimed in claim 24 wherein the polymer/polyol composition is as claimed in claim 4.

31. A method as claimed in claim 24 wherein the organic polyisocyanate is a mixture of toluene diisocyanate and polymeric MDI.

32. A method for producing a polyurethane elastomer by reacting a mixture comprising (a) a polymer/polyol composition as claimed in claim 1 and (b) an organic polyisocyanate, in the presence of a catalyst for the reaction of (a) and (b) to produce the polyurethane.

33. A polyurethane foam produced by the method of claim 24.

34. A polyurethane foam produced by the method of claim 25.

35. A polyurethane foam produced by the method of claim 26.

36. A polyurethane foam produced by the method of claim 27.

37. A polyurethane foam produced by the method of claim 28.

38. A polyurethane foam produced by the method of claim 29.

39. A polyurethane foam produced by the method of claim 30.

40. A polyurethane foam produced by the method of claim 31.

41. A polyurethane foam produced by the method of claim 32.

* * * * *